United States Patent
Borlinghaus et al.

[11] Patent Number: 5,332,290
[45] Date of Patent: Jul. 26, 1994

[54] SEAT BELT LOAD TRANSFER MECHANISM FOR BENCH SEAT

[75] Inventors: Hans J. Borlinghaus, Mt. Clemens; Joseph T. Galea, Auburn Hills; Thomas B. Blake, Mt. Clemens, all of Mich.

[73] Assignee: General Motors Corporation, Detroit, Mich.

[21] Appl. No.: 937,047

[22] Filed: Aug. 31, 1992

[51] Int. Cl.⁵ .............................. A62B 35/04
[52] U.S. Cl. ...................... 297/473; 280/806; 297/468
[58] Field of Search ............... 297/473, 468; 280/806

[56] References Cited

U.S. PATENT DOCUMENTS

| | | | |
|---|---|---|---|
| 3,424,494 | 1/1969 | McIntyre et al. | 297/468 |
| 4,194,786 | 3/1980 | Gilmore | 297/468 |
| 4,225,184 | 9/1980 | Strowick | 297/468 |
| 4,248,480 | 2/1981 | Koucky et al. | 297/473 |
| 4,316,633 | 2/1982 | Zaccariotto | 297/468 X |
| 4,526,424 | 7/1985 | Korth | 297/473 |
| 4,676,555 | 6/1987 | Tokugawa | 297/473 |
| 4,824,175 | 4/1989 | Tokugawa | 297/473 |
| 4,884,825 | 12/1989 | Grunewald et al. | 297/473 X |
| 4,923,214 | 5/1990 | Siegrist et al. | 297/473 X |
| 5,125,611 | 6/1992 | Cox | 297/473 X |

FOREIGN PATENT DOCUMENTS

| | | | |
|---|---|---|---|
| 2400898 | 7/1975 | Fed. Rep. of Germany | 297/468 |
| 3439077 | 5/1986 | Fed. Rep. of Germany | 297/468 |
| 3614457 | 11/1987 | Fed. Rep. of Germany | 297/473 |
| 2183988 | 6/1987 | United Kingdom | 297/473 |

Primary Examiner—Lloyd A. Gall
Attorney, Agent, or Firm—Charles E. Leahy

[57] ABSTRACT

A vehicular bench seat is supported on two spaced adjustment tracks in a vehicle for fore and aft position adjustment. A seat belt buckle moves with the seat during position adjustment. The buckle is connected to a slider-body which, in turn, is slideably carried along a track attached to the underbody of the vehicle. When a load is applied to the seat belt buckle, the slider body is pivoted into engagement with a tooth bar adjacent the track to lock the slider body and the buckle relative to the underbody. A drag link pivotally extends from the slider body and connects to the seat bottom for moving the slider body and the attached buckle in unison with the seat during fore and aft position adjustment.

3 Claims, 4 Drawing Sheets

SEAT BELT LOAD TRANSFER MECHANISM FOR BENCH SEAT

TECHNICAL FIELD

The invention relates to a buckle for a seat belt harness which is moveable with a vehicular bench seat, and more particularly relates to a mechanism for guiding the buckle during fore and aft adjustment of the bench seat and for locking the buckle in position when placed under load.

BACKGROUND ART

Bench type seats have been a popular feature in automobiles for many years. A typical bench seat includes a seat cushion and a backrest cushion supported on a unitary seat frame. The seat frame is supported above the vehicular underbody upon two spaced adjustment tracks, one adjustment track adjacent the driver side door and the other adjustment track adjacent the occupant side door. The adjustment tracks are each fixedly anchored to the #2 and #3 reinforcement bars extending transversely across the underbody. An occupant restraint system is usually associated with the seat for restraining an occupant in the seat in an emergency situation.

Generally an occupant restraint system includes a seat belt harness comprised of a lap belt and a shoulder belt which merge at a clasp structured to releasibly engage a manual buckle mechanism. The buckle is typically attached by a flexible strap directly to the underbody and thus functions as an anchor when the occupant restraint system is placed under load. A dedicated reinforcement point for the buckle attachment is provided on the underbody rearwardly of the #3 reinforcement bar in areas flanking the tunnel portions of the underbody to adequately resist anticipated loads and limit the well-known phenomenon of excursion caused chiefly by underbody flexure.

One such buckle is provided for the each driver side and passenger side occupants of a bench seat. The buckles normally extend between the seat cushion and the backrest cushion on the inboard side of each of the driver side and the passenger side of the bench seat for easy accessibility when joining or disjoining the seat belt harness and buckle assembly. Because the prior art buckles are anchored to the underbody, comfort and use difficulty may be encountered when the seat is adjusted between forward and rearward positions to comfortably orient the driver.

If the driver is particularly small in stature, the seat will be adjusted forwardly to the maximum extent of the seat adjustment mechanism. This relative movement of the seat causes the underbody-anchored buckle of the occupant restraint system to become positioned below and behind the seat cushion. Thus, a small statured occupant must often search and grope for the buckle when joining and disjoining the seat belt harness. Searching for the buckle behind or below the seat cushion is particularly aggravated when in an unfamiliar vehicle, when low lighting conditions or disagreeable weather conditions exist. Also, with the buckle positioned below and behind the cushion of a forwardly adjusted seat, the lap and/or shoulder belts may wrap around the seat cushion in such a manner causing an uncomfortable condition.

Alternatively, if the driver is large in stature, the bench seat assembly will be adjusted fully rearwardly such that the buckle anchored to the underbody will be positioned significantly above and forwardly of the seat cushion. Thus, when the buckle is connected to the seat belt harness, the buckle may lay uncomfortably across the large driver's leg or in some other way cause discomfort due to its position above the seat cushion. Also, the upwardly projecting buckle may interfere with occupant and/or cargo sliding movement laterally across the bench seat.

The prior art has sought to overcome these difficulties problem by providing a mechanism to move the buckle in unison with the seat during fore and aft adjustment. In this manner, the buckle is always presented in the same position relative to the seat cushion regardless of the fore and aft adjustment position. According to this technology, the buckle is attached to a sliding carriage below the bench seat. The carriage is operatively carried on a tooth bar mechanism. The tooth bar is pivotally connected to the dedicated rear tunnel reinforcement point behind the #3 reinforcement bar mentioned above. By anchoring the tooth bar rearwardly of the #3 reinforcement bar, the force vector created along the buckle when the occupant restraint system is placed under load is substantially in line with the point of attachment of the tooth bar. In other words, the prior art solution to moving the buckle in unison with the seat during fore and aft adjustment requires ultimate anchoring of the buckle to an underbody reinforcement point provided at or near the tunnel and the #3 reinforcement bar, which in actuality has no usefulness other than to anchor the buckle to the underbody.

Many automobiles manufactured today are designed so that the consumer may choose whether a bench seat or split seats are to be installed. The underbodies of such are exactly the same for economic reasons, regardless of whether a bench seat or split seats are to be installed. The primary draw back of the prior art becomes evident when it is understood that a split seat does not require the special underbody reinforcement point behind the #3 reinforcement bar because the buckle can be anchored directly to the seat track adjustment mechanism. Therefore, because the automobile manufacturer will only make one underbody style and the bench seat underbody requires the special underbody reinforcement area for the buckles, it logically follows that all underbodies must include the dedicated underbody reinforcement point behind the #3 reinforcement bar regardless of whether a bench or a split seat is to be installed.

Because of their popularity, more split seats are installed in automobiles than bench seats. In the minority of prior art underbodies to receive bench seats, the dedicated underbody reinforcement is necessary. However, the underbody reinforcement area provided behind the #3 reinforcement bar in the majority of vehicle underbodies having installed split seats is redundant and hence wasteful. It will be readily appreciated that significant cost and weight savings can be realized by eliminating the dedicated underbody reinforcement point altogether, yet the prior art has no known structure for properly anchoring the seat belt buckles of a bench seat to the underbody except by the reinforcement structure behind the #3 reinforcement bar. Therefore, according to prior art technology, all vehicle underbodies are manufactured in conformity having a dedicated underbody reinforcement point behind the #3 reinforcement bar, which is completely redundant and wasteful in split seat applications.

SUMMARY OF THE INVENTION AND ADVANTAGES

The subject invention overcomes the disadvantages of the prior art by providing a fore and aft adjustable bench-type vehicular seat assembly having a seat belt buckle movable with the seat during fore and aft adjustment. The assembly comprises a vehicular underbody including a transversely extending #2 reinforcement bar and a #3 reinforcement bar spaced parallel from the #2 reinforcement bar. A seat is provided having at least one opening therein. A pair of adjustment tracks slideably interconnect the seat and the #2 and #3 reinforcement bars for adjusting the fore and aft position of the seat relative to the underbody in directions perpendicular to the #2 and #3 reinforcement bars. A seat belt buckle operatively extends through the opening in the seat. The improvement of the subject invention comprises a buckle anchor means interconnecting the seat belt buckle and the #3 reinforcement bar for translating the seat belt buckle with the seat during fore and aft position adjustment to consistently orient the seat belt buckle at an optimum elevation above the seat, without requiring a dedicated reinforcement point for the seat belt buckle on the underbody behind the #3 reinforcement bar.

The subject invention overcomes the disadvantages of the prior art by the buckle anchor means which fully and adequately anchors the seat belt buckle to the #3 reinforcement bar while allowing the buckle to move in unison with the seat during fore and aft position adjustment and without requiring a special reinforcement point on the underbody. Therefore, because the buckle anchor means attaches to the #3 reinforcement bar, all underbodies for a particular vehicle style can be manufactured identically without redundant and wasteful underbody reinforcement structure existing when split seats are installed. Hence, significant cost savings are realized by the subject invention because the buckle anchor means permits the dedicated underbody reinforcement point behind the #3 reinforcement bar to be completely eliminated. Further, according to the buckle anchor means of the subject invention, the seat belt buckle is continuously positioned in an optimum orientation relative to the seat cushion thereby eliminating searching and groping for the buckle.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
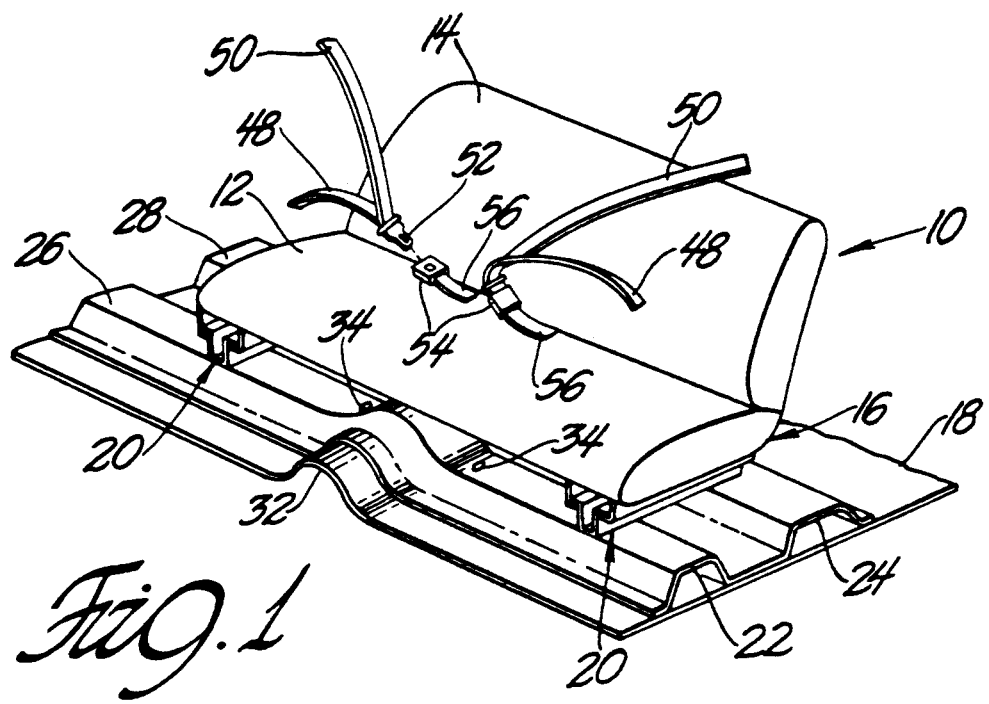
FIG. 1 is a simplified perspective view of a vehicle bench seat assembly supported on a vehicular underbody.

Referring to the Figures, wherein like numerals indicate like or corresponding parts throughout the several views, an adjustable vehicular bench seat assembly according to the subject invention is generally shown at 10 in FIG. 1. The seat assembly 10 includes a seat cushion 12 and an angularly extending backrest cushion 14. The seat cushion 12 and backrest cushion 14 are supported above a seat frame, generally indicated at 16 in FIG. 6, typically fabricated from a rigid structural material. The seat frame 16, in turn, is supported above a vehicular underbody 18 by a pair of adjustment tracks, generally indicated at 20. The adjustment tracks 20 are attached to the underbody 18 at predetermined locations provided on a #2 reinforcement bar 22 and a #3 reinforcement bar 24.

Figure 5:
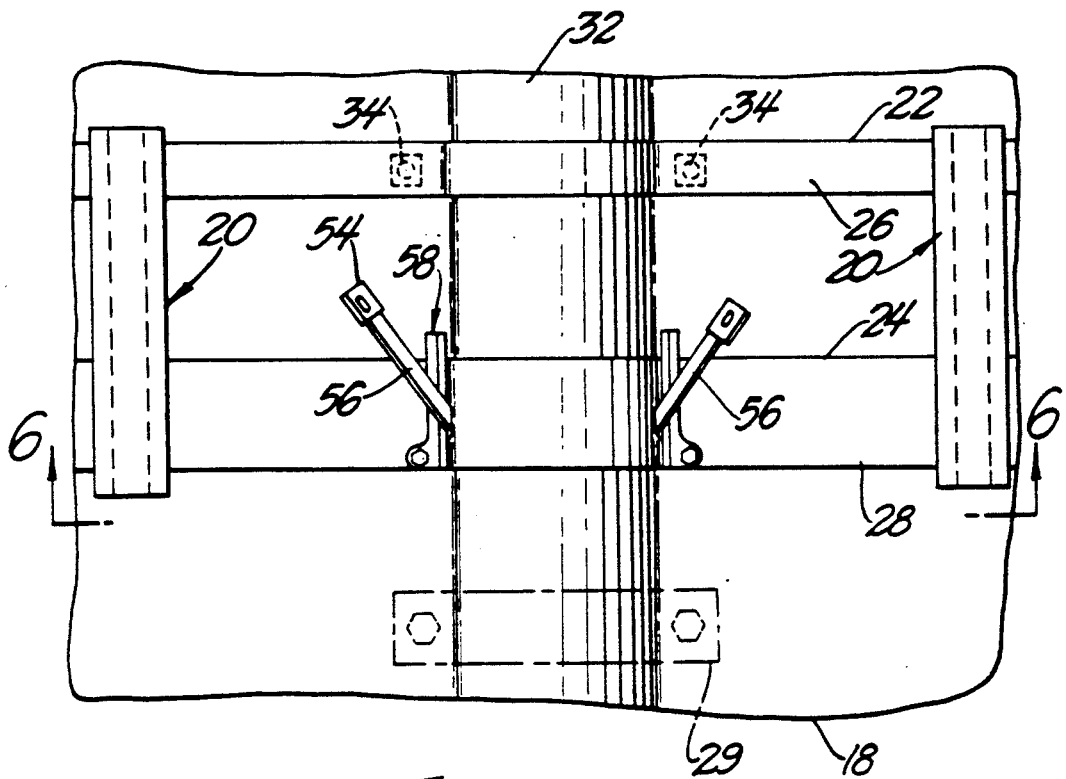
FIG. 5 is a top view of the vehicular underbody with the seat assembly removed.

The #2 reinforcement bar 22 extends transversely of the underbody 18 substantially below the front edge of the seat cushion 12. The #3 reinforcement bar 24 is spaced parallel from the #2 reinforcement bar, in the rearward direction, and is located generally below the rearward edge of the seat cushion 12. The #2 and #3 reinforcement bars each comprise an inverted generally U-shaped channel extending upwardly from the underbody 18 and forming a substantially planar mounting surface 26, 28, respectively. Typically, the mounting surface 28 of the #3 reinforcement bar 24 is wider than the mounting surface 26 of the #2 reinforcement bar 22. The reinforcement bars 22, 24 rigidify the underbody 18 and provide secure mounting locations for the adjustment tracks 20. In FIG. 5, a dedicated prior art reinforcement area 29 is shown in phantom positioned rearwardly of the #3 reinforcement bar 24. The dedicated reinforcement area 29 is completely eliminated in accordance with the teachings of the subject invention.

Figure 6:
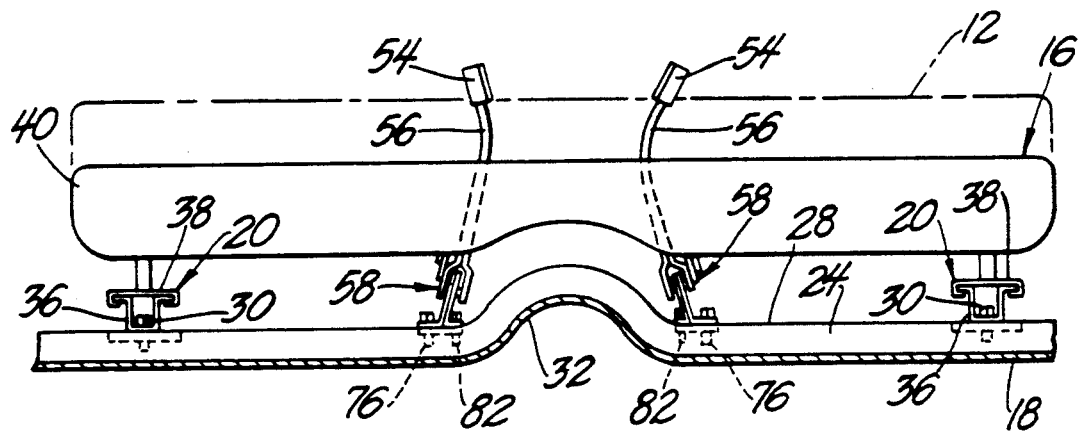
FIG. 6 is a rear elevational view taken substantially along lines 6—6 of FIG. 5 and showing a seat frame positioned over the underbody.

The adjustment tracks 20 extend perpendicularly across the reinforcement bars 22, 24 and are securely fastened to each by fasteners, such as threaded bolts 30 shown in FIG. 6. Typically, weld nuts are located on the underside of the reinforcement bars 22, 24, below the adjustment tracks 20 for receiving the fasteners 30. Alternatively, it is well known to attach the adjustment tracks 20 to the #2 reinforcement bar 22 using simple locator hooks.

To enhance efficiency, the automobile manufacturer constructs the underbody 18 and reinforcement bar 22, 24 system of each vehicle underbody the same regardless of whether a bench seat assembly 10 is be installed or a split seat assembly (not shown). When a bench seat assembly 10 is installed on the underbody 18, only two adjustment tracks 20 are provided, one along the outboard driver side and another along the outboard passenger side. However, whenever split seats are installed over the underbody 18, a pair of adjustment tracks are required for each seat section. Therefore, a total of four adjustment tracks are required for split seat applications. The two additional adjustment tracks are fixed on flanking sides of a tunnel portion 32 of the underbody 18 in much the same manner as the adjustment tracks 20 illustrated in FIGS. 1, 5 and 6. Therefore, for split seat arrangements, weld nuts (not shown) are provided in the reinforcement bars 22, 24 located beneath corresponding holes 34 provided for threaded fasteners (not shown) to secure the two additional adjustment tracks to the underbody 18. Because the automobile manufacturer must standardize all underbodies 18 regardless of whether split seats or bench seat assemblies 10 are to be installed, the holes 34 and accompanying weld nuts therebelow are present but unused in bench seat assembly 10 applications.

The adjustment tracks 20 each include a generally U-shaped fixed rail 36 having a pair of outwardly extending flanges at the upper ends thereof. A sliding rail 38 is movably carried on the fixed rail 36 in such a manner so as to provide smooth gliding horizontal movement between the two. The sliding rail 38 has a generally C-shaped cross section, as shown in FIG. 6, which matingly engages with the flanges of the fixed rail 36. Preferably, a polymeric interface material is located between the sliding rail 38 and the fixed rail 36 to reduce sliding friction. The adjustment tracks 20 are effective to adjust the fore and aft position of the seat assembly 10 to suit the physical characteristics of the driver occupant.

Figure 2:
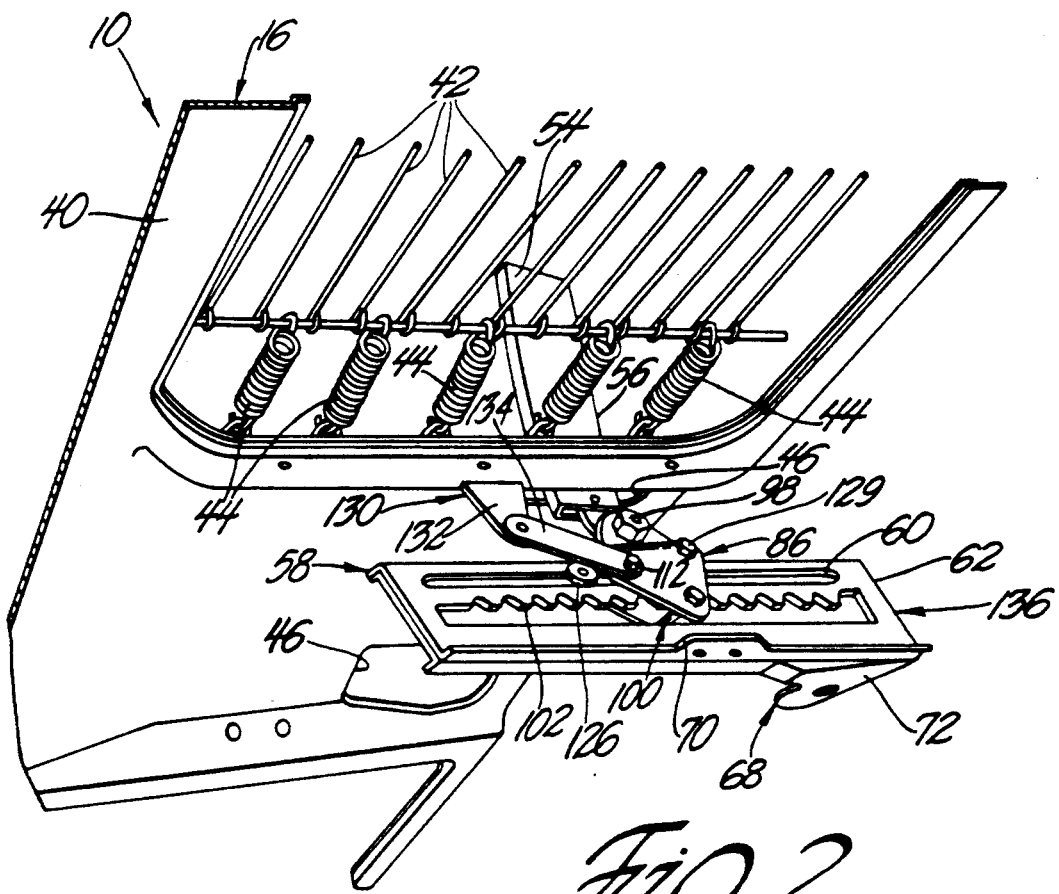
FIG. 2 is a fragmentary perspective view of a seat frame and buckle anchor means as shown from below.

Referring to FIG. 2, the seat frame 16 is shown including a metallic superstructure 40. A cushion support web 42 is carried by a spring set 44 to provide maximum support and comfort for the seat cushion 12 and the occupant. A pair of openings 46 are provided in the superstructure 40 of the seat frame 16 adjacent the inboard side of each of the driver occupant and passenger occupant positions. The openings 46 are located such that a passage is provided through the seat assembly 10 between the seat cushion 12 and the backrest cushion 14.

The seat assembly 10 includes an occupant restraint system operatively associated therewith. The occupant restraint system is best shown in FIG. 1 including a seat belt harness comprising a lap belt 48 and a shoulder belt 50 supported on the vehicle body at various anchor points (not shown). The lap 48 and shoulder 50 belts merge together at a metal clasp 52. A seat belt buckle 54 is positioned above the seat cushion 12, adjacent the backrest cushion 14, for releasibly engaging the clasp 52. The buckle 54 includes the standard manual thumb or finger release button for disjoining the lap and shoulder belts 48, 50. The buckle 54 includes a strap-like portion 56 extending between the seat cushion 12 and backrest cushion 14 and through the opening 46 in the seat frame 16. The strap portion 56 is flexible and may comprise the usual woven fabric member surrounded by a sheath-like plastic cover.

A buckle anchor means, generally indicated at 58 in FIGS. 2-6, interconnects the seat belt buckle 54 and the #3 reinforcement bar 24 for translating the seat belt buckle 54 with the seat assembly 10 during fore and aft position adjustment to consistently orient the seat belt buckle 54 at an optimum elevation above the seat cushion 12. In other words, the buckle anchor means 58 comprises a mechanism which is attached to the #3 reinforcement bar 24 and functions to move the buckle 54 in unison with the seat assembly 10 as it is adjusted forwardly and rearwardly to accommodate the physical requirements of the driver occupant. In this manner, the buckle anchor means 58 eliminates the need for searching or groping to find the buckle 54 and also provides an anchor attachment to the #3 reinforcement bar 24 so that additional reinforcing points 29 are not required on the underbody 18 behind the #3 reinforcement bar 24.

The buckle anchor means 58 includes a guide means 60 for establishing a linear guide path below the seat assembly 10. The guide means 60 takes the form of a slot-like track formed in an elongated frame 62. The guide means 60 extends perpendicular to the #2 and #3 reinforcement bars 22, 24 and has a length corresponding at least to the extent of fore and aft position adjustment provided for the seat assembly 10. The frame 62 is fabricated from first 64 and second 66 half members complimentarily formed to nest together in surface-to-surface contact, as best shown in FIG. 3.

Figure 3:
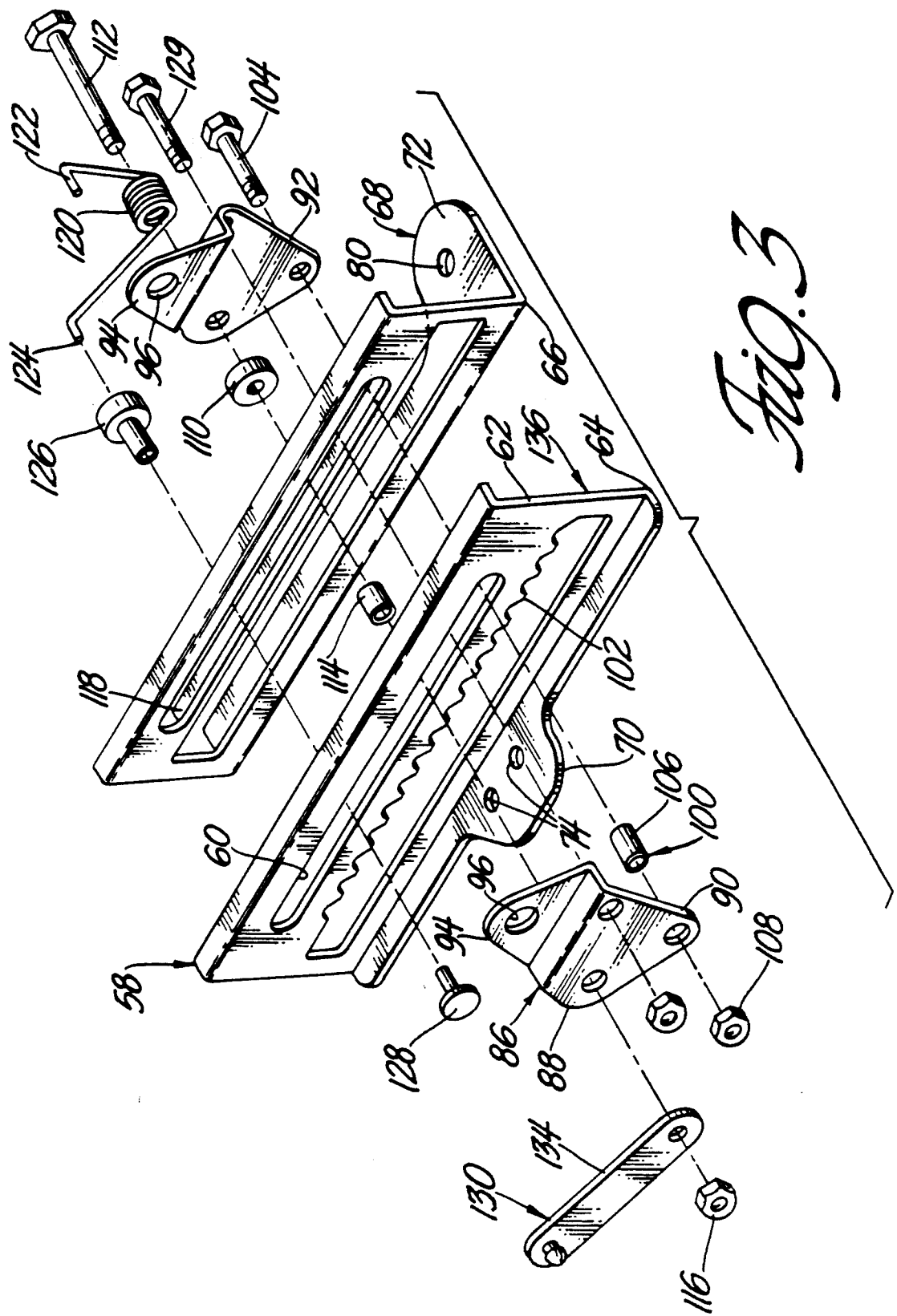
FIG. 3 is an exploded view of the buckle anchor means.
Figure 4:
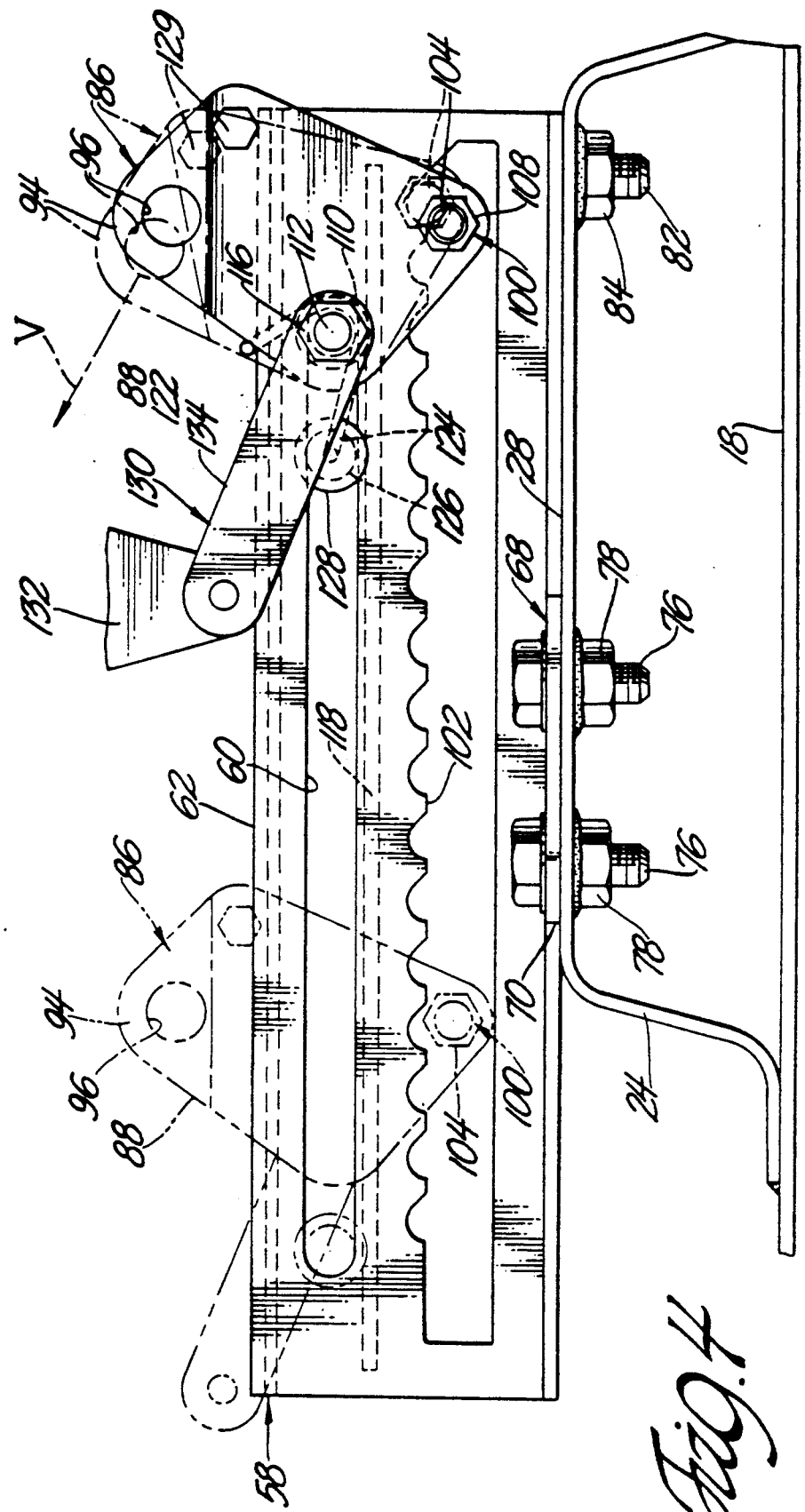
FIG. 4 is a side view of the buckle anchor means supported on the #3 reinforcement bar of the underbody.

An attachment means, generally indicated at 68 in FIGS. 2-4, is provided for attaching the guide means 60 to the underbody 18 below the seat assembly 10. The attachment means 68 includes a plurality of mounting tabs 70, 72 extending from the frame 62 in spaced locations. The forwardmost mounting tab 70 extends from the first half member 64 approximately midway between the forward and rearward ends thereof.

In the embodiment illustrated in the Figures, the mounting tab 70 includes a pair of apertures 74 for receiving threaded fasteners 76 secured to the #3 reinforcement bar 22 by respective weld nuts 78. Alternatively, the mounting tabs 70 may include a hook-shaped locator (not shown) which engages within a corresponding opening in the #3 reinforcement bar 24 for securing and locating the frame 62 in place upon the #3 reinforcement bar 24. The mounting tab 72 extends from the second half member 66 adjacent the rearwardmost end of the frame 62. The mounting tab 72 includes an aperture 80 for receiving a threaded fastener 82 secured to the rearwardmost edge of the #3 reinforcement bar 24 by a weld nut 84. In this manner, the attachment means 68 extends integrally through the frame 62 and guide means 60 to securely retain the buckle anchor means 58 to the #3 reinforcement bar 24. Of course, if additional mounting strength is required, the frame 62 can be extended forwardly with appropriate mounting tabs provided to secure the buckle anchor means 58 to the #2 reinforcement bar 22 at the provided holes 34.

A carriage means, generally indicated at 86 in FIGS. 2-4, is movably carried on the guide means 60 along the guide path for attaching the seat belt buckle 54 to the guide means 60 independently of the seat assembly 10. The carriage means 86, more specifically, includes a slider body 88 comprised of first 90 and second 92 slider body halves. The slider body halves 90, 92 are generally mirror images of one another and sandwiched about the sides of the frame 62. The slider body 88 is operatively carried in the track of the guide means 60 for linear movement along the guide path.

The slider body 88 includes an ear 94 having an opening 96 formed therein for receiving a nut and bolt fastener arrangement 98 connecting the strap portion 56 of the buckle 54. The ear 94 extends above the frame 62 and forms a moment arm structure tending to pivot or tip the slider body 88 when a tensile load is applied along the buckle 54.

An engagement means, generally indicated at 100 in FIGS. 2-4, is provided for selectively locking the carriage means 86 to the guide means 60 in response to tensile loading along a vector V applied from the seat belt buckle 54. The vector V is shown in phantom in FIG. 4 extending in the upward and forward direction of the vehicle. The force vector V reacts through the ear 94 of the slider body 88 causing a tipping motion as illustrated in phantom in FIG. 4.

The engagement means 100 also includes a tooth bar 102 formed integrally within the frame 62 and extending parallel to the guide path. As best shown in FIG. 3, the tooth bar 102 is formed only on the first half member 64 of the frame 62 with sufficient clearance provided in the second half member 66 for free engagement by the slider body 88. The tooth bar 102 comprises a series of teeth separated by rounded notches. Each tooth of the tooth bar 102 includes a sloping forward flank and pocket-like rearward flank.

The slider body 88 includes an engagement pin 104 selectively engageable with the tooth bar 102 in response to tensile loading applied from the seat belt buckle 54. The engagement pin 104 comprises a bolt extending through both body halves 90, 92 of the slider body 88 for supporting a bushing 106 between the slider body halves 90, 92 for engagement with the tooth bar 102. A nut 108 secures the end of the bolt. The outer diameter of the bushing 106 substantially mates with and conforms to the rounded notches in the tooth bar 102 when seated in an engaged position. When the engagement means 100 is actuated by application of a tensile force along the vector V, the bushing 106 is pivoted toward the notches in the tooth bar 102. If the bushing 106 is not in direct line with the notch to engage immediately, the bushing 106 will contact either the flat crest of the adjacent tooth or the sloped forward flank of the tooth and roll or slide into engagement with the nearest notch. The pocket-like rearward flank of the teeth securely hold the bushing 106 in place while a tensile load along the vector V is sustained.

The slider body 88 includes a roller 110 journalled in the track of the guide means 60 and rollably supported on a roller axle 112. The roller axle 112 comprises an elongated bolt supporting the roller 110 and a spacer bushing 114 between the body halves 90, 92. A nut 116 secures the axle 112 to the slider body 88. The axle 112 supports the roller 110 and spacer bushing 114 within the slot-like track of the guide means 60.

The second half member 66 of the frame 62 includes a formed ledge 118 extending perpendicularly outwardly therefrom and forming a contact surface for the roller 110. The ledge 118 is best shown in FIG. 3. The roller 110 forms a primary pivot member for the slider body 88 such that when tensile loads are applied along the force vector V to the ear 94, the slider body 88 rotates about the roller 110 causing the engagement pin 104 to rotate into engagement with the tooth bar 102. The engagement pin 104 is offset from a line extending between the roller 110 and the opening 96 in the ear 94 so that when a load is applied along the force vector V, the engagement pin 104 rotates about the roller 110 upwardly into engagement with the tooth bar 102.

A biasing means is reactive between the frame 62 and the slider body 88 for continuously urging the engagement pin 104 away from the tooth bar 102. The biasing means includes a spring 120 of the torsion spring type coiled about the shank portion of the axle 112. A pair of arms 122, 124 extend from the spring 120. The arm 122 engages and seats in a notch in the second slider body half 92. The other arm 124 is operatively disposed in a lead roller 126 which, in turn, is supported on the ledge 118 and located within the track of the guide means 60. A keeper 128 is coupled to the lead roller 126 for preventing movement of the lead roller 126 out of the track of the guide means 60.

As viewed from FIG. 4, the spring 120 is reactive between the lead roller 126 and the slider body 88 to urge the slider body 88 in a clockwise rotary path about the roller 110. In this manner, the engagement pin 104 is maintained out of engagement with the tooth bar 102. However, when a load is placed upon the buckle 54 in the direction of the force vector V, the torsional force of the spring 120 is quickly overcome causing the engagement pin 104 to move directly into engagement with the tooth bar 102. A stop pin 129 in the form of a nut and bolt arrangement passing through the slider body 88 is provided for limiting spring 120 rotation of the slider body 88. The stop pin 129 engages and rides along the uppermost edge of the frame 62 while the engagement pin 104 is forced away from the tooth bar 102 by the spring 120.

A connector means, generally indicated at 130 in FIGS. 2 and 4, moves the carriage means 86 along the guide path during seat adjustment while the engagement means 100 remains unactuated. In other words, the connector means 130 structurally interconnects the seat frame 16 and the slider body 88 so that as the seat assembly 10 is adjusted fore and aft, the slider body 88 and the attached buckle 54 move in unison therewith. The connector means 130 includes a bracket 132 extending downwardly from the seat frame 16. A drag link 134 pivotally interconnects the axle 112 of the roller 110 to the bracket 132. Therefore, as the seat assembly 10 is adjusted fore and aft, the integral bracket 132 pulls or pushes the drag link 134 which, in turn, correspondingly carries the slider body 88. The pivotal connections of the drag link 134 are essential to allow flexure of the seat in up and down directions caused by the weight of occupants disposed thereon and during movement of the vehicle over rough terrain. Such vertical deflections of the seat frame 16 will not be transmitted to the slider body 88 because the drag link 34 is pivotally connected to both the bracket 132 and the axle 112.

The structural configuration of the frame 62 comprises a torsion resistance means, generally indicated at 136 in FIGS. 2–4. The torsion resistance means 136 is disposed between the engagement means 100 and the attachment means 68 for resisting torsional forces created by misalignment between the tensile loading vector V and the attachment means 68 to limit travel of the carriage means 86 after actuation of the engagement means 100 to improve occupant comfort. Said another way, because the tensile load force vector V is not always aligned with one of the mounting tabs 70, 72, a moment is created within the frame 62 whenever the buckle 54 is placed under load. The torsion resistance means 136 includes that portion of the frame 62 which is rigid and unbending between the tooth bar 102 and the mounting tabs 70, 72. This rigid structure in the frame 62 resists the torsional forces created in the frame 62 under load. The torsion resistance means 136 also includes the construction of the slider body 88 which rigidly locks itself to the frame 62 when the engagement pin 104 engages the tooth bar 102. Specifically, the opposing bends in the slider body halves 90, 92 which overlap the uppermost edge of the frame limit pivotal movement of the slider body 88 as soon as the engagement pin 104 is fully seated within a notch in the tooth bar 102, thereby resisting torque from the opening 96 in the ear 94 down to the mounting tabs 70, 72.

The torsion resistance means 136 of the subject invention permits the buckle anchor means 58 to be supported upon the #3 reinforcement bar 24 in the general position where an adjustment track would be located if a split seat were installed upon the underbody 18. In this manner, additional underbody reinforcement structures 29 are not required to be fabricated upon the underbody 18 behind the #3 reinforcement bar 24 for anchoring the buckle 54. The elimination of the reinforcement structure 29 also unclutters the area along the underbody 18 behind the #3 reinforcement bar 24.

In operation, a driver occupant seated upon the seat cushion 12 may operatively position the lap belt 48 and shoulder belt 50 across his/her body by joining the clasp to the buckle 54. With the occupant restraint system in place, the driver may adjust the fore and aft position of the seat assembly 10 along the adjustment tracks 20 until a comfortable driving position is achieved. During this adjustment, the slider body 88 is moved with the seat assembly 10 via the connector means 130. It should be noted, also, that the lap belt 48 and shoulder belt 50 will not necessarily pull or slacken across the driver's body during seat position adjustment because the buckle 54 moves with the seat assembly 10 in the manner described above. Throughout such seat adjustment and under all normal conditions, the engagement pin 104 remains fully disengaged from the tooth bar 102, thereby permitting free sliding movement of the slider body 88 along the frame 62 in unison with the seat assembly 10.

However, when the occupant restraint system is placed under load, such as by the application of a tensile force along the force vector V, the buckle 54 pulls the ear 90 in a forward and upward direction, thereby causing slight pivotal movement of the slider body 88 about the axle 112, which, in turn, causes the engagement pin 104 to seat within a notch between adjacent teeth along the tooth bar 102. With this, the occupant restraint system becomes fully locked in place such that the slider body 88 and attached buckle 54 cease any further pivotal or linear movement.

It is anticipated that the bench seat assembly 10 may be used by three occupants simultaneously, in which case the third or center seat occupant must be provided with an occupant restraint system. This can be accomplished in one of several ways. One method is to simply use the prior art technique of anchoring the buckle for the center seat occupant to the underbody 18 so that the buckle will not move in unison with the seat during adjustment. Since a center seat occupant is rarely present, this method is not particularly distasteful. However, according to another method, all of the advantages of the subject invention can be maintained if the buckle for the center seat occupant is connected in tandem to the ear 94 of either the driver side or passenger side buckle anchor means 58. In this manner, the buckle for the center seat occupant will move in unison with the seat assembly 10 during adjustment.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims the invention may be practiced otherwise than as specifically described.

What is claimed is:

1. A fore and aft adjustable bench-type vehicular seat assembly having a seat belt buckle moveable with the seat during adjustment, said assembly comprising: a vehicular underbody including a transversely extending #2 reinforcement bar and a #3 reinforcement bar spaced parallel from said #2 reinforcement bar; a seat having an opening therein; a pair of adjustment tracks slideably interconnecting said seat and said #2 and #3 reinforcement bars for adjusting the fore and aft position of said seat relative to said underbody in directions perpendicular to said #2 and #3 reinforcement bars; a seat belt buckle operatively extending through said opening in said seat; and buckle anchor means spaced from said adjustment tracks and interconnecting said seat belt buckle and said #3 reinforcement bar for translating said seat belt buckle with said seat during fore and aft position adjustment to consistently orient said seat belt buckle at an optimum elevation above said seat.

2. An assembly as set forth in claim 1 wherein said buckle anchor means includes a mounting tab fixedly engaging said #3 reinforcement bar.

3. An assembly as set forth in claim 1 wherein aid #3 reinforcement bar comprises an inverted generally U-shaped channel extending upwardly from said underbody and forming a substantially planar mounting surface for receiving said buckle anchor means.

* * * * *